May 23, 1939. B. W. WARNER Re. 21,097

BROODER

Original Filed Feb. 7, 1936 2 Sheets-Sheet 1

Inventor

Boyd W. Warner.

By Clarence A. O'Brien and Hyman Berman Attorneys

BROODER

Original Filed Feb. 7, 1936 2 Sheets-Sheet 2

Inventor
Boyd W. Warner.

By Clarence A. O'Brien and Hyman Berman Attorneys

Reissued May 23, 1939

Re. 21,097

UNITED STATES PATENT OFFICE 21,097

BROODER

Boyd W. Warner, North Manchester, Ind., assignor to The Warner Brooder & Appliance Corporation, North Manchester, Ind., a corporation of Indiana Original No. 2,098,475, dated November 9, 1937, Serial No. 62,838, February 7, 1936. Application for reissue May 12, 1938, Serial No. 207,640

11 Claims. (Cl. 119—33)

The present invention relates to new and useful improvements in brooders and has for its primary object to provide, in a manner as hereinafter set forth, novel means for electrically heating and ventilating the brooder, also for keeping the floor thereof dry and preventing sweat in said brooder.

Other objects of the invention are to provide a brooder of the character described which will be comparatively simple in construction, strong, durable, highly efficient and reliable in use, compact, light in weight, portable and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
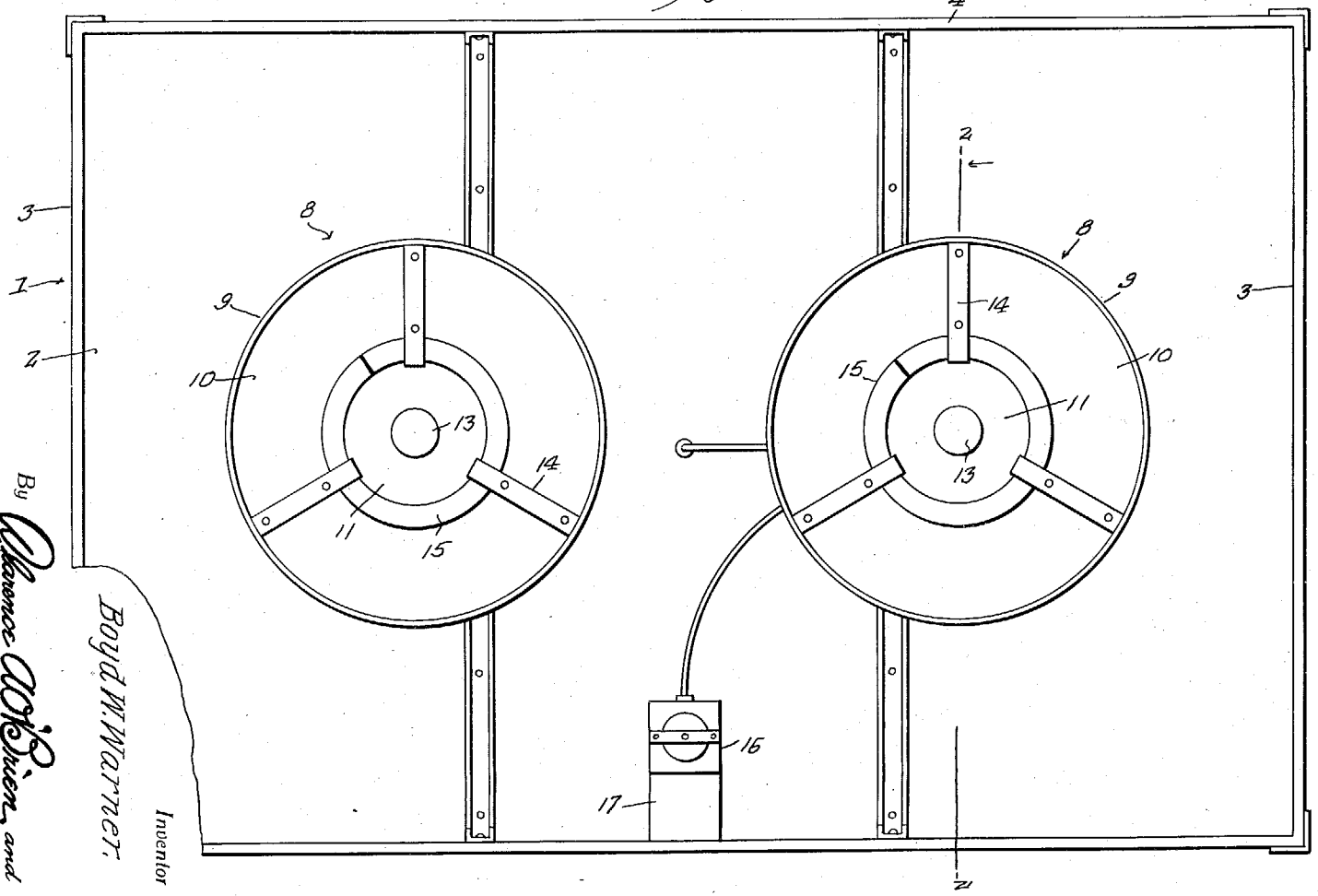
Figure 1 is a bottom plan view of a brooder constructed in accordance with the present invention, a corner portion thereof and the curtain being omitted.
Figure 2:
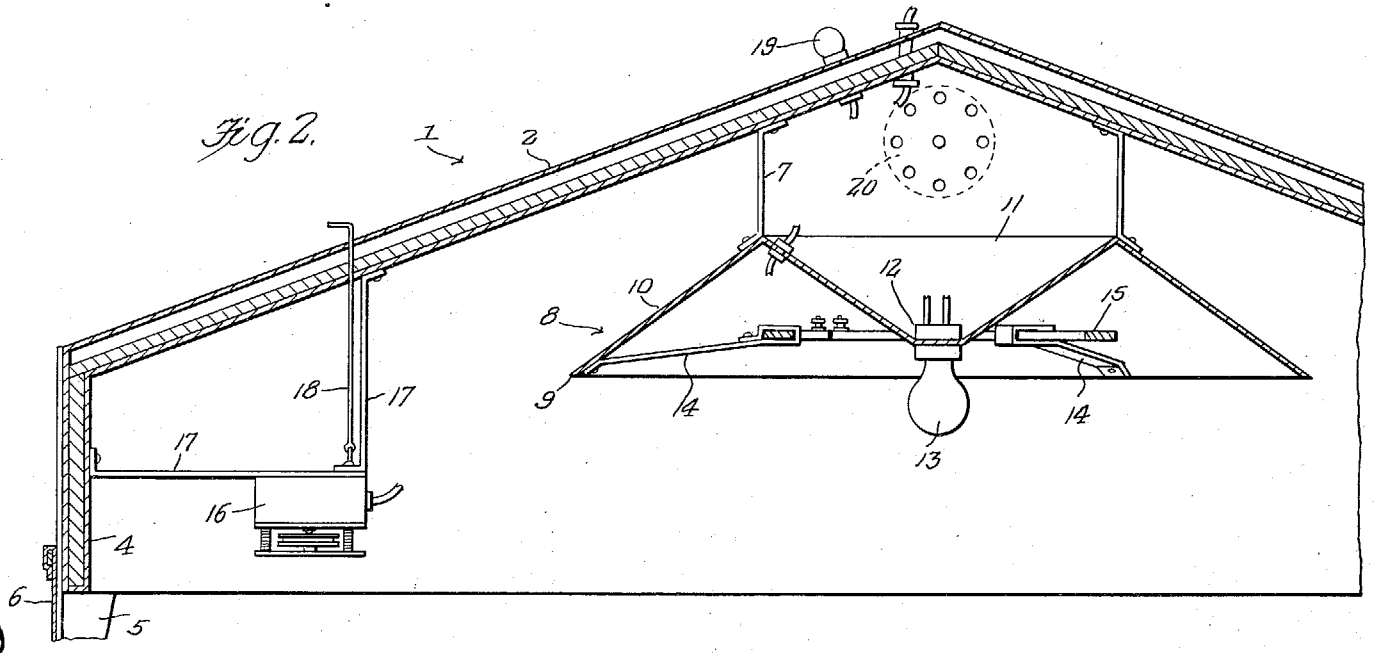
Figure 2 is a vertical sectional view, taken substantially on the line 2—2 of Figure 1.
Figure 3:
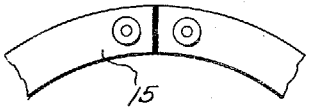
Figure 3 is a plan view of a portion of one of the electric heating rings.
Figure 4:
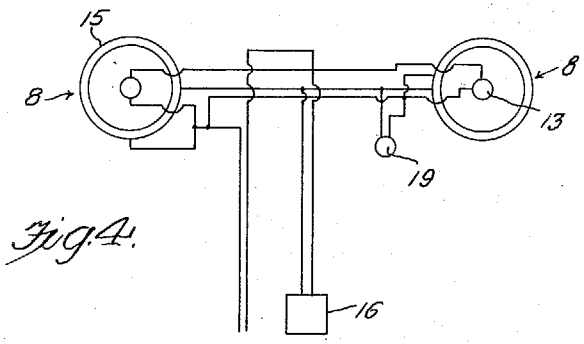
Figure 4 is a diagrammatic view of a wiring system which may be used.

Referring now to the drawings in detail, it will be seen that the embodiment of the invention which has been illustrated comprises a hover or canopy which is designated generally by the reference numeral 1, said canopy including an anticlinal roof 2, end walls 3 and side walls 4. The canopy 1 is supported in elevated position by suitable legs 5. Depending from the ends and sides 3 and 4, respectively, of the canopy 1, are curtains 6. It will be observed that the canopy 1 is of laminated, insulating construction.

Suspended on suitable hangars 7 beneath the roof 2 are electric heating units which are designated generally by the reference numeral 8. Each unit 8 comprises a reflector 9 including a truncated outer cone 10 and a relatively reversed inner cone 11. Mounted in the apex of the inner cone 11 is an electric socket 12 for the reception of an ultra-violet ray lamp 13.

Mounted in the reflector 9 on suitable brackets 14, between the outer and inner cones 10 and 11, respectively, is an electric heating ring 15 of suitable metal. The current to the heating rings 15 of the units 8 is automatically controlled by a thermal switch 16 which is mounted in the canopy 1 on suitable supports 17. The thermal switch 16 is provided with a suitable hand control 18 which extends through the roof 2. The reference numeral 19 designates a tell-tale lamp which is mounted in the roof 2 for indicating when the heating rings 15 are energized. The reference numeral 20 designates hand adjusted ventilators which are mounted in the upper portions of the end walls 3 of the canopy 1.

In operation heat from the rings 15 is radiated and distributed evenly throughout the brooder by the reflectors 9 of the units 8 in a manner to dry the floor and keep said floor dry. Of course, in this manner the chicks are also warmed. Any moisture and odors from the floor will rise in a natural manner and pass out through the ventilators 20. It will be observed that forced ventilation is eliminated, the heat being projected and distributed by radiation. This radiated heat does not depend on conduction through the air from the radiators and becomes effective heat only when it strikes the earth or floor and surrounding objects, including the chicks. This heat is then projected back up from the earth or floor and surrounding objects by conduction through the air, as distinguished from radiation by which it warmed said earth or floor and surrounding objects. Of course, some of the heat does go by conduction through the air due to the unreflected heat from the rings 15 themselves.

It is believed that the many advantages of a brooder constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. A brooder including a hover which has an anti-clinal roof, end walls and side walls, ventilators mounted in the upper portion of the end walls, and a heating unit supported by the hover, said unit comprising a reflector including a substantially truncated outer cone and a relatively reversed inner cone, and an electric heating element mounted between the outer end inner cones, said heating element being substantially surrounded by free space, whereby substantially free movement of air around said entire heating unit is permitted.

2. A brooder including a hover which has an anti-clinal roof, end walls and side walls, ventilators mounted in the upper portion of the end walls, and a heating unit supported by the hover, said heating unit comprising a truncated reflecting cone and a heating element lying in substantially a single plane and spaced from the wall of the cone and the axis of the cone at the plane of the heating element, said element being positioned between the upper and lower edges of the cone wall and a reflector closing the space constituting the smaller base of the truncated cone.

3. A brooder including a hover which has an anti-clinal roof, end walls and side walls, ventilators mounted in the upper portion of the end walls, and a heating unit supported by the hover, said heating unit comprising a truncated reflecting cone and a heating element lying in substantially a single plane and spaced from the wall of the cone and the axis of the cone at the plane of the heating element, said element being positioned between the upper and lower edges of the cone wall, and a member extending transversely across and occupying the space constituting the smaller base of the truncated cone, whereby heat rays directed toward said member will be returned to the space between and below the walls of the truncated cone.

4. A brooder including a hover which has an anti-clinal roof, end walls and side walls, ventilators mounted in the upper portions of said end walls and a heating unit supported by the hover, said heating unit comprising a member having inner and outer downwardly inclined walls intersecting on a continuous line on a single plane at their upper edges, the lower surfaces of said walls constituting reflectors, and an electrical heating element substantially centrally spaced from said walls and housed between divergent portions thereof.

5. A brooder including a hover which has an anti-clinal roof, end walls and side walls, ventilators mounted in the upper portions of said end walls and a heating unit supported by the hover, said heating unit comprising a member having inner, outwardly and downwardly inclined reflecting walls, spaced at their upper edges, an electrical heating element substantially centrally spaced from and located between the reflecting walls and housed between divergent portions thereof, and a heat ray directing member completely covering the space formed by the upper edges of the downwardly inclined walls.

6. A brooder including a hover having opening in its upper portion for ventilation, a heating unit supported by the hover in spaced relation to the walls of the latter and below the plane of the ventilating openings, said unit comprising a reflector including a substantially truncated outer cone and a relatively reversed inner cone, and an electric heating element mounted between the outer and inner cones, said heating element being substantially surrounded by free space, whereby substantially free movement of air will take place around said heating element and said heating unit.

7. A brooder including a hover having openings in its upper portion for ventilation, and a heating unit supported by the hover in spaced relation to the walls of the latter and below the plane of the ventilating openings, said heating unit comprising a truncated reflecting cone and a heating element lying in substantially a single plane and spaced from the wall of the cone and the axis of the cone at the plane of the heating element, said element being positioned between the upper and lower edges of the cone wall and a reflector closing the space constituting the smaller base of the truncated cone.

8. A brooder including a hover having openings in its upper portion for ventilation, and a heating unit supported by the hover in spaced relation to the walls of the latter and below the plane of the ventilating openings, said heating unit comprising a truncated reflecting cone and a heating element lying in substantially a single plane and spaced from the wall of the cone and the axis of the cone at the plane of the heating element, said element being positioned between the upper and lower edges of the cone wall, and a member extending transversely across and occupying the space constituting the smaller base of the truncated cone, whereby heat rays directed toward said member will be returned to the space between and below the walls of the truncated cone.

9. A brooder including a hover having openings in its upper portion for ventilation, and a heating unit supported by the hover in spaced relation to the walls of the latter and below the plane of the ventilating openings, said heating unit comprising a member having inner and outer downwardly inclined walls intersecting on a contiuous line on a single plane at their upper edges, the lower surfaces of said walls constituting reflectors, and an electrical heating element substantially centrally spaced from said walls and housed between divergent portions thereof.

10. A brooder including a hover having openings in its upper portion for ventilation, a heating unit supported by the hover in spaced relation to the walls of the latter and below the plane of the ventilating openings, said heating unit comprising a member having inner, outwardly and downwardly inclined reflecting walls, spaced at their upper edges, an electrical heating element substantially centrally spaced from and located between the reflecting walls and housed between divergent portions thereof, and a heat ray directing member completely covering the space formed by the upper edges of the downwardly inclined walls.

11. A brooder including a hover having ventilating openings in its upper portion, a heating unit, means to support said unit within the upper portion of the hover in spaced relation to the walls of the latter and below the plane of the ventilating openings, said heating unit comprising a reflector having a continuous closed wall inclining outwardly from top to bottom, a second reflector having a wall surface with divergent portions having inclinations reversed with respect to the inclinations of adjacent parts of the first wall, and an electric heating element mounted between the first and second reflecors, said heating element being substantially surrounded by free space whereby movement of air will take place within the space defined by the said wall of the first reflector and around substantially the entire heating unit.

BOYD W. WARNER.